Feb. 12, 1946. J. W. DAWSON 2,394,535
ELECTRICAL CONTROL SYSTEM
Filed Feb. 11, 1943 2 Sheets-Sheet 1

INVENTOR.
JOHN W. DAWSON,
By Elmer J. Gorn
ATTY.

Feb. 12, 1946.    J. W. DAWSON    2,394,535
ELECTRICAL CONTROL SYSTEM
Filed Feb. 11, 1943    2 Sheets-Sheet 2

INVENTOR.
JOHN W. DAWSON,
BY Elmer J. Gorn
ATTY.

Patented Feb. 12, 1946

2,394,535

UNITED STATES PATENT OFFICE 2,394,535

ELECTRICAL CONTROL SYSTEM

John W. Dawson, West Newton, Mass., assignor to Raytheon Manufacturing Company, Newton, Mass., a corporation of Delaware Application February 11, 1943, Serial No. 475,571

17 Claims. (Cl. 219—4)

This invention relates to an electrical control system of the type in which electrical energy is stored for subsequent discharge through a load, and more particularly to a system in which such stored energy is discharged in timed impulses through a welding load.

In systems of the type to which the invention relates it has been found desirable, as described in the copending application of Hans Klemperer, Serial No. 316,798, filed February 1, 1940, to supply the welding energy in the form of a single impulse in which the current rises abruptly to a predetermined level and thereafter is maintained relatively constant for a substantial portion of the welding impulse. In that case a plurality of condensers discharging in overlapping sequence into the welding load are used to provide single welding impulses. The second bank of condensers in that case is discharged by an electrical control means which is effective immediately after the peak current discharge of the first condenser bank has been attained. In other words the second condenser is discharged immediately upon the reversal of the voltage of the first condenser.

It is among the objects of the present invention to provide for a similar welding impulse from a plurality of condenser banks, while providing for a sufficient variation in the time between the discharge of the successive condenser banks to permit a control of the heat level within a narrow predetermined level.

A further object of the invention is to provide for a short preheating period of alternating current through the welding load immediately prior to and in close synchronization with the supply of stored welding energy from one or more condenser banks.

Another object of the invention is to supply alternating preheat current to the welding load in such timed relation to initiation of the supply of stored welding energy that the last half-wave of alternating preheating current will be in the opposite direction to the supply of welding energy from the storage source, such as one or more condenser banks.

It is a further object of the invention to provide a delay of the order of milliseconds after the termination of supply of alternating preheating current to the load prior to the initiation of supply of welding energy from the condensers.

The above and other objects and features of the invention will in part be obvious to those skilled in the art and in part be set forth in more detail in the following description taken in conjunction with the accompanying drawings in which.

Figure 1:
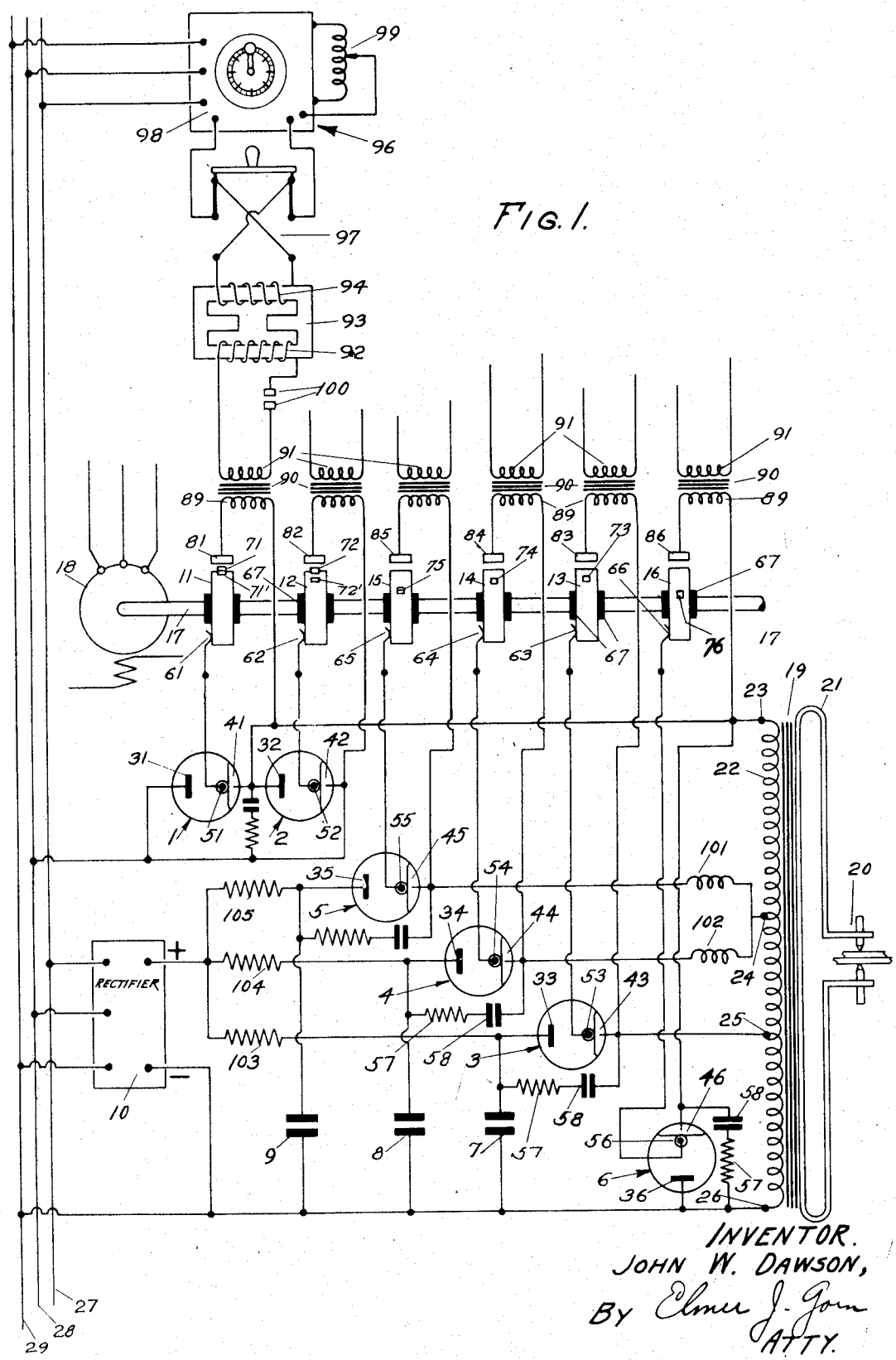
Fig. 1 is a diagram of a condenser welding system embodying the invention.

As shown in Fig. 1 of the drawings, the welding system includes a discharge unit comprising six heavy current mercury pool ignition-controlled tubes indicated by reference numerals 1 to 6, inclusive; three capacitor banks, 7, 8, and 9; a rectifier 10 for charging the capacitor banks; a timing assembly including a plurality of rotary distributors 11 to 16, inclusive, which distributors are mounted upon a shaft 17 driven by a synchronous motor 18; and a welding transformer 19. All of these parts and their functions will be hereinafter more fully described.

Welding current is supplied to the welding load 20 from a secondary loop 21 of the welding transformer 19. The primary 22 of the transformer 19 is provided with a plurality of taps including upper end tap 23, intermediate taps 24, 25, and lower end tap 26. The primary 22 is adapted to be supplied with energy from an alternating current source, such as the lines 27, 28 and 29, of a three-phase power supply source. This energy is received by the transformer in part from condenser banks 7, 8 and 9, which store energy received from rectifier 10, and partly from the power supply line directly. In each instance the timing of the supply from the power source to one of the taps 23—26 of the primary winding 22 is controlled by one or another of the discharge tubes 1—6.

The tubes 1—6 may be any arc type tubes having controlled discharge, but preferably are of the type previously mentioned having, respectively, anodes 31—36 and pool type cathodes 41—46, usually of mercury. Igniters 51—56 are provided, one for each tube, for initiating a cathode spot on the pool in order to permit the tube to conduct current. Thus, the igniters 51—56 constitute means for controlling the initiation of the discharge in their respective tubes, assuming a suitable potential difference exists between the anode and the cathode of the tube to be ignited at the time the igniting impulse is supplied.

The igniters 51—56 may be of any suitable type, but preferably are of the electrostatic type, each consisting of a conductor separated and insulated from the cathode by a thin layer of glass.

One tube suitable for the purpose of the present invention is disclosed in the United States patent to Percy L. Spencer, 2,257,768, and in view of this example other tubes having suitable characteristics may be selected by those skilled in the art. In order to assist the tubes in reliably starting it is preferred that a resistance 57 in series with a condenser 58 be connected between the anode and the cathode of each tube.

The igniters 51—56 are adapted to be supplied with igniting impulses from the ignition timing assembly in the following manner. The igniters 51—56 are connected by brushes or other suitable contacts 61—66, respectively, to the rotating distributors 11—16. The distributors 11—16 are suitably insulated from the shaft 10 by insulating collars 67, and are each provided with at least one contact 71—76 on the peripheral surface thereof, which contacts are angularly separated with reference to each other and with reference to the speed of rotation of the shaft 17 so as to give the desired timing sequence to the ignition of the tubes 1—6 in a manner which will be hereinafter more fully described. Some of the distributors 1—6 have more than one contact on the peripheral surface thereof where the corresponding tube is intended to fire more than once during a single rotation of the shaft 17. Thus, distributors 11 and 12 have additional contacts 71' and 72' properly spaced from contacts 71 and 72, to cause tubes 1 and 2 to be discharged in a predetermined sequence as will hereinafter be more fully set forth. These contacts on the peripheral surface of the distributors 11—16 are adapted to coact with stationary contacts 81—86, one of which is provided adjacent each of the distributors 11—16, respectively, to permit timed energy impulses to be supplied to the igniters 51—56 from the secondary windings 89 of igniting transformers 90.

It will be understood that the contacts 71—76 on the distributors 11—16 and the corresponding coacting contacts 81—86 may be of the sliding type, such as conducting segments and coacting brushes, or they may be spark gap points which permit the current to jump the gap therebetween as the same come into juxtaposition during the rotation of the shaft 17.

The igniting transformers 90 are provided with primary windings 91, each of which is adapted to be supplied with voltage impulses from the secondary winding 92 of a peaking transformer 93. Only one of the peaking transformers is shown in the drawings, but it will be understood that each of the other primary windings 91 is similarly supplied from other peaking transformers.

The primary winding 94 of the peaking transformer 93 is adapted to be energized from a phase-shifting device 96, which device includes a 180° phase-selector 97, a 60° phase-selector 98, and a phase-vernier 99. The phase-shifting device 96 is connected to a suitable source of alternating current which in the case shown is the three-phase power supply lines 27, 28 and 29. By the phase-shifting device 96 the phase of the voltage supplied to the primary winding 94 may be adjusted at will throughout the range of 360°. Accordingly, the time of the voltage peaks across the secondary winding 92 may be selected as desired. Contact points 100 may be provided in the connections between the secondary winding 92 of the speaking transformer 93 and the primary winding 91 of the ignition transformer 90 to permit control of the circuit by a suitable relay or switch. It will be understood that each of the igniters 51—56 of the tubes 1—6 is similarly supplied with igniting impulses from similar phase-shifting devices and intermediate circuits.

Impedances 101 and 102, which are preferably inductances, are provided between the tubes 4 and 5 and the tap 24 of primary winding 22. Resistances 103, 104 and 105 are provided in the connections between the tubes 3, 4 and 5, respectively, and the rectifier 10. The function of the inductances 101 and 102 and of the resistances 103—105 will be set forth in the course of the following description of the operation of the system.

In operation ignition voltage is supplied from the lines 27, 28 and 29 through the phase-shifting device 96 to primary 94 of the peaking transformer 93. The peaking transformer 93 delivers peaks of about fifty volts whenever the contacts 100 are closed. This peaked voltage is stepped up by the ignition transformer 90 and will pass or spark over between the contact or point 71 of the distributor 11 and the stationary contact or segment 81 when these contacts are in juxtaposition. The width of one or the other of the contacts 71 and 81 is such that they are in conductive relationship to each other during each rotation of the distributor 11 for a period corresponding to one-half cycle of the 60-cycle supply source. The synchronous motor 18 drives the distributors 11—16 at a speed of 180 R. P. M., and accordingly each rotation of the distributor shaft 17 corresponds to a 20-cycle program. The distributor 11 serves the tube 1, and distributors 12, 13, 14, 15 and 16 serve the tubes 2, 3, 4, 5 and 6, respectively. When the contacts or segments 71 and 81 of the distributor are adjacent, ignition voltage will be supplied to the igniter 51, and a cathode spot will be excited on the cathode 41 of the tube 1 and accordingly the tube 1 will become conductive provided a suitable potential difference exists between the anode 31 and the cathode 41 of this tube. The timing of the distributor 11 is made such that contact 71 thereof is contiguous to the contact 81 at the instant when a half-wave or pulse of current moving through power supply line 28 is positive relative to the line 29. The cathode 41 of tube 1 is therefore excited during some portion of the period that a positive potential from the line 28 is applied to the anode 31 and a pulse or half-wave of current will flow from the line 28 through the tube 1 and to the tap 23 of the primary 22 downwardly through the primary windings to the tap 26 and thence to the power supply line 29.

Figure 2:
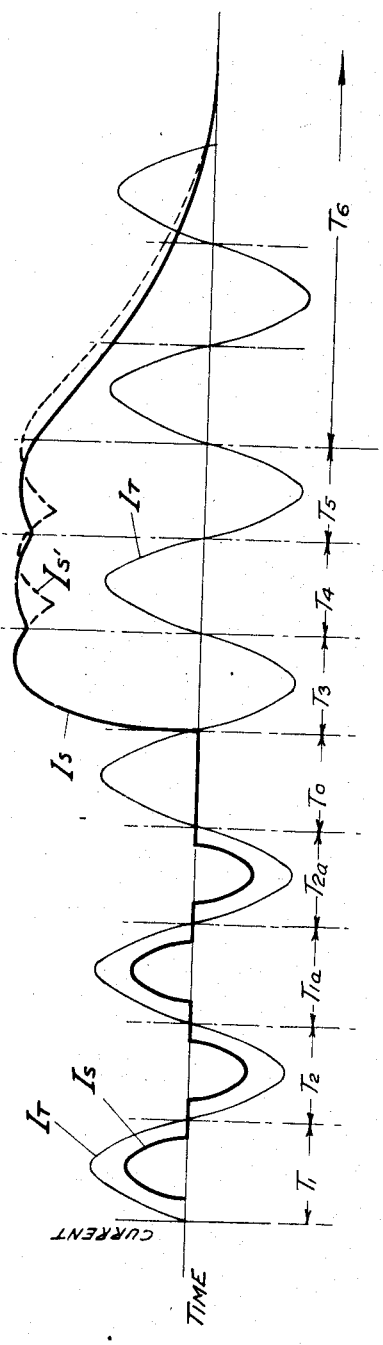
Fig. 2 is a set of curves illustrating the mode of operation of the invention.
Figure 3:
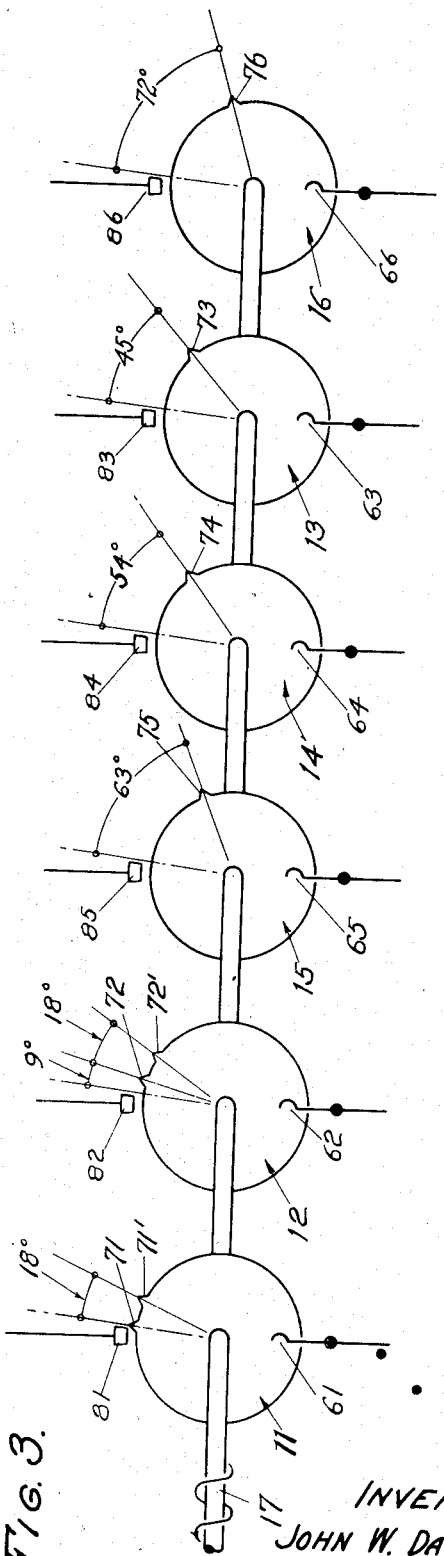
Fig. 3 is a diagram of a portion of the timing assembly showing the relative timing of the ignition circuits of the various tubes.

The operation will be more thoroughly understood by referring to the set of curves shown in Fig. 2 and the timing diagram shown in Fig. 3. The curves do not purpose to show the operation of the system quantitatively, although they do represent in a general manner the nature of the operation. The curve $I_s$ represents the current in the welding transformer and the curve $I_t$ represents a 60-cycle alternating current wave inserted to show the relative timing. Referring to these figures, when the contact or segment 71 moves adjacent to the contact or segment 81, a cathode spot is excited in tube 1 by the igniter 51 and permits the supply of a half-wave of current to the transformer 19. This half-wave of current directly from the power supply line 28 to the welding transformer is indicated by the portion $T_1$ of the curve $I_s$. This current from the line 28 passes downwardly through the primary windings 22 and thence to the power supply line, and a low voltage heating current is induced in the secondary 19 of the welding transformer, which heating current is supplied to the load 20.

The half-cycle of current from the power supply source, by way of the tube 1, is immediately followed, upon a reversal of the voltage in the lines 28 and 29, by a similar half-cycle of primary current passing through the tube 2. The ignition of this tube is controlled by the distributor 12, which distributor 12 carries a contact 72 on the peripheral surface thereof positioned to come adjacent its corresponding stationary contact 82 one half-wave later than the juxtaposition of the corresponding contacts 71 and 81 of the distributor 11. Since the shaft 17 is rotated at a speed of 180 R. P. M., the angular lag of the contact 72 relative to the contact 71 is 9 degrees. Thus the cathode 42 of the tube 2 is excited and the tube becomes conductive at an instant when the polarity of the current in the lines 28 and 29, is reversed, that is to say, when the line 29 has become positive relative to the line 28, and accordingly a positive potential is applied to the anode 32 of the tube 2 at the instant the cathode 42 thereof is excited by the igniter 52. The tube becomes conductive and a half-wave or pulse of current flows from the line 29 to the tap 26 of the primary winding 22 and thence upwardly through the primary winding to the tap 23 thereof and thence through the tube 2 to the power supply line 28. This current is supplied through the primary winding 22 in the reverse direction, during this second half-wave period, to the direction in which the first half-wave passed through the primary. Accordingly alternating preheating current at low voltage is induced in the secondary winding 19 of the welding transformer and supplied to the load 18, the second half-wave being indicated by the portion $T_2$ of the curve. By providing additional contacts 71' and 72' on the periphery of the distributors 1 and 2 additional half waves of preheating current from the power supply source may be supplied to the welding load. Obviously, the contact 71' will be positioned to lag the contact 71 by 18° and the same is true of the lag of the contact 72' behind the contact 72. Thus an alternating preheating current from the power supply source may be supplied to the work for as many half-wave periods as desired. In the curve shown in Fig. 2 the tubes 1 and 2 are alternately excited and are conductive during two half-wave periods each of the preheating period. The annotations $T_1$, $T_2$, and $T_3$, etc. indicate the periods during which the respective tubes 1, 2 and 3, etc. are conductive. The annotations $T_{1a}$ and $T_{2a}$ each indicates a second period during the same program in which the tubes 1 and 2 are conductive.

The setting of the phase shifter 96 may be varied to the end that the igniting voltage supplied to the igniter 51 of the tube 1 may be impressed at any desired time during the period when contact 71 is adjacent the contact 81. As this period corresponds to a rotation through 9° of the distributor drum 11, which in turn corresponds to one half-wave of the power source, all or any desired portion of a half-wave pulse of the power source may be selected for transmission by the tube 1 to the welding load. The same is true of the igniting voltage supplied to the igniter 52 of the tube 2 which may be selected by a phase selector identical with phase shifter 96 so that the energy content or heating value of the preheating current as supplied by either or both of the tubes 1 and 2 may be varied within wide limits. Accordingly the preheating current may have relatively large peak values, while its root mean square value may have a relatively small value. This is desirable since the peak value of the current particularly in the last half-wave of preheat current determines the ability of the preheat current to reset any residual flux remaining in the transformer core due to the preceding welding current impulse while the root mean square value determines the ability of the preheat current to supply heat to the load. The flux resetting may require considerable peak values of current while the preheat should usually be relatively limited. Also by setting the phase selector 96 to supply igniting voltages to the peaking transformer 93 a little after the rise in voltage in the power supply line, a slight delay is permitted between the periods during which the tubes 1 and 2 are conductive. Accordingly it will be observed that while the system may be designed to supply any desired number of half-wave periods of preheating current, $T_1$, $T_2$, $T_{1a}$, etc. to supply any desired maximum quantity of preheat, within any given design, the quantity of preheating current may be varied within wide limits up to such maximum quantity.

After the last half-wave of preheating current, which in this case is indicated by the portion $T_{2a}$ of the curve, there may be a slight rest period extending over as much as a half-cycle during which none of the tubes 1—6 is conductive. The current to the welding load during this period is zero as indicated by portion $T_0$ of the curve $I_s$. It is desirable that the initial impulse of welding current be supplied within a short time but not instantly after the last half-wave of preheat current, and the delay of approximately one half cycle, which corresponds to about eight milliseconds, is sufficient for the purpose of permitting the tube 2, which was excited during the last half-wave of preheat current, to become deionized before the application of a positive potential to the anode 32 thereof from the condenser bank 7. While the delay period may be more or less than that indicated by the portion $T_0$, it is in any case of the order of a few milliseconds. If the welding current were applied immediately at the end of the last half-wave of preheat current the tube 2 would not have had time to become deionized so that the application of the positive potential of condenser 7 to the anode 32 would cause the tube 2 to be discharged even in the absence of an exciting voltage applied to igniter 52.

After the short deionization period $T_0$, the supply of the main welding current to the transformer 19 is initiated by the discharge of the condenser bank 7. The condenser bank 7, along with condenser banks 8 and 9, is continuously charged by the rectifier 10 and is discharged downwardly through the portion of the welding transformer 22 between taps 25 and 26.

The current impulse from the condenser bank 7 is controlled by tube 3, the discharge of which is initiated by igniter 53. Ignition voltage is supplied to the igniter 53 from an ignition circuit including a phase-shifting device and peaking transformer identical with that described in connection with tube 1 and is timed by distributor 13 having a contact 73 positioned to lag approximately 45° behind the contact 71 of the distributor 11, which initiated the program, or 18° behind the contact 72' which initiated the last half-wave of preheating current during the period $T_{2a}$. Thus the contact 73 permits a delay of approximately a half-cycle after the termination of the last half-wave of preheat current. However, as previously explained this delay may be more, or less, so that the exact position of the contact 73 will depend upon the length of the deionization period T₀ and is not dependent upon the phase of the power supply lines 27, 28 and 29. Thus, the system may be designed, by altering the position of the contacts 73, to cause the initiation of a current impulse from the condenser 7 within any half-wave period after the last half-wave of preheating current. Within any given design the excitation of the ignition of tube 3, and accordingly the timing of the impulse of current from the condenser 7, may be controlled by a phase-shifting device which supplies ignition voltage to the igniter 53. It will be understood that such device is a duplication of the phase-shifting device 96 for supplying ignition voltage to the tube 1, and its setting will determine, within the range of a half-wave period, the duration of the deionizing period between the last half-wave of preheating current and the initiation of the current impulse from the condenser 7.

The anode 33 of the tube 3 is connected to the positive pole of the condenser bank 7 so that a substantial potential difference exists between the anode 33 and the cathode 43 at the time igniter 53 excites cathode 43, and the tube 3 immediately becomes conductive to permit the discharge of condenser bank 7. An impulse of stored energy is supplied to transformer 19 by way of tap 25 and passes downwardly to tap 26 in a direction opposite to the direction of the last half-wave of preheat current. The intensity of this impulse is far greater than the maximum intensity of the preheat current, and accordingly the welding current rises abruptly in the manner shown by the portion T₃ of the curve I_s. After the welding current, resulting from the impulse supplied by the condenser bank 7, has begun to decay, but before it is materially below maximum level, the cathode 44 of the tube 4 is excited by the igniter 54. The condenser bank 8, the positive side of which is connected to the anode 34, is thereupon discharged through the tube 4, the inductance 102, and thence through that portion of the primary 22 lying between the taps 24 and 26. The excitation of a cathode spot on the cathode 44 by the igniter 54 is produced by an ignition circuit similar in all respects to the ignition circuit previously described in connection with tube 1 except that the contact 74 on the distributor 14 which controls this tube is so positioned as to be adjacent its coacting contact 84 at the proper time in the program. This contact 74 lags some 9° behind the contact 73 or 54° behind contact 71.

The discharge of the condenser bank 8 maintains the current through the welding load at substantially the same level as that obtained by the discharge of the condenser bank 7. This current therefore tends to increase the value of the flux in the transformer 19 beyond the initial value attained by the discharge of the condenser 7 and this increasing flux tends to maintain a substantially direct current through the load 20 during the period T₄ of the curve I_s.

At the termination of the discharge of the condenser bank 8, contact 75 of the distributor 15 comes adjacent to the corresponding stationary contact 85 and an ignition voltage is supplied to the igniter 55 of the tube 5. Accordingly the tube 5, the anode 35 of which is connected to the positive side of a condenser bank 8, becomes conductive and the condenser bank is discharged through the tube 5, the inductance 101, and thence to that portion of the primary winding lying between taps 24 and 26 and thence to the power supply line 29. This impulse of current from the condenser bank 9 continues to increase the flux in the transformer 19 and accordingly maintains the current through the welding load 20. While in the form shown three condenser banks are used additional condenser banks may be added to discharge successively and in the same direction through the transformer 19 to maintain a constant current through the welding load for as long a period as is desired, within the limit imposed by the saturation of the transformer core.

The provision of separate ignition control systems for each of the tubes 3, 4 and 5 permits, within any given design, a fine variation in the total energy content or heating value of the welding current controlled by these tubes. For example, by setting the phase shifting device of the ignition circuit of the tube 4 to supply ignition voltages to the igniter 54 at a point somewhat later than the beginning of the period T₄, the current supplied by the condenser 7, as controlled by the tube T₃, would no longer terminate at the point shown in the curve I_s, but would continue into the succeeding period in the manner shown by the dotted line I_s'. This results in a correspondingly lower heating value than the curve I_s. Similarly the ignition of the tube 5 may be delayed to continue the curve I_s' at a lower value than it would have, had the tube T₅ been ignited earlier in the program.

After the discharge of the last bank of condensers, which in the case shown is indicated by the termination of the period T₅, the cathode 46 of shunt tube 6 is excited by its igniter 56 from an ignition circuit controlled by the distributor 16. The distributor 16 has a contact 76 positioned on the peripheral surface thereof to come adjacent the contact or segment 86 at a time immediately following the discharge of the last condenser bank 9. In this case the angular lag would be about 72 degrees after the initiation of the program which began with the supply of preheat current to the tube 1. Accordingly the tube 6 becomes conductive and provides a shunt path across the primary winding 22 which prevents the return of energy from the welding transformer to the condenser banks and the current to the welding load 20 is permitted to decay substantially exponentially as indicated by the portion T₆ of the curve I_s.

It will be understood that the angular lag of the contact 76 behind the contact 71 may be altered in the design and construction of the device to correspond to any other alterations in the program which change the duration of such program to cover periods greater or less than the duration of the one illustrated; but within any given design the timing of the ignition of the shunt tube 6 may be altered over a period of substantially 9° of rotation of the distributor drum 16, corresponding to the period during which contact 76 is adjacent contact 86, by means of the phase selector supplying the igniter 56 with ignition voltage.

The inductances 101 and 102 serve as electrical "cushions" preventing certain current changes and thereby easing the duty of tubes 4 and 5. Without these cushions, and assuming that the current commutates for instance from tube to tube, the current flow in one tube would immediately cease, leaving the vapor in an ionized state. If high inverse voltage is applied to the tube simultaneously, these conditions cause considerable ion bombardment of the anode and might result in back-firing of the tube. The use of inductances 101 and 102 improves this condition by reducing the rate of change of current and voltage of the tubes. Less ionization is left following conduction and less steep rise in inverse voltage is developed. These protective inductances are designed to saturate at relatively low current and hence influence the current wave forms only at base and transfer points.

The three capacitor banks 7, 8 and 9 have a common connection to the positive terminal of the rectifier 10 and all banks are charged to the same voltage level. The charging time is relatively long and accordingly resistances 103, 104 and 105 are inserted between each of the tubes 3, 4 and 5, respectively, and the rectifier 10. If these resistances were not provided the condenser banks 8 and 9 would tend to discharge through the tube 3 by way of their common connection with the rectifier 10 upon the ignition of the tube 3. Thus all condenser banks 7, 8 and 9 would be discharged simultaneously through the tube 3. The resistors 103 and 104 may be made sufficiently high in value that substantially no energy is exchanged between the capacitor banks during the relatively short period over which they are successively discharged. At the same time the charging period of the condensers 7, 8 and 9 is sufficiently long so that the resistors 103, 104 and 105 do not interfere with the charging of the condenser banks from the rectifier 10.

While there has been herein disclosed but a single embodiment of the invention, other embodiments within the scope of the appended claims will be obvious to those skilled in the art from a consideration of the form shown.

What is claimed is:

1. The method of resistance spot welding which comprises supplying alternating current to a welding load to preheat the material at the spot to be welded, discontinuing said alternating current and supplying direct current to the welding load after the termination of the last half-wave of preheating current and within a period corresponding to the duration of one cycle of said alternating current.

2. A resistance spot welding system comprising means for supplying alternating current to a welding load to preheat the material at the spot to be welded, and means for supplying direct current to the welding load after the termination of the supply of preheating current and within a period corresponding to the duration of one cycle of said alternating current.

3. A resistance spot welding system comprising means for supplying alternating current to a welding load to preheat the material at the spot to be welded, and energy storage means for supplying direct current to the welding load after the termination of the supply of preheating current and within a period corresponding to the duration of one cycle of said alternating current.

4. A resistance spot welding system comprising means for supplying alternating current to a welding load to preheat the material at the spot to be welded, and a plurality of condensers for supplying direct current to the welding load after the termination of the supply of preheating current and within a period corresponding to the duration of one cycle of said alternating current.

5. The method of resistance spot welding which comprises supplying alternating current to a welding load to preheat the material at the spot to be welded, and supplying a plurality of successive overlapping impulses of stored energy to said welding load to effect the welding operation, the first of said impulses being supplied after the termination of the supply of preheating current and within a period corresponding to the duration of one cycle of said alternating current.

6. A resistance spot welding system comprising means for supplying alternating current to a welding load to preheat the material at the spot to be welded, and means for supplying a plurality of successive overlapping impulses of stored energy to said welding load to effect the welding operation, the first of said impulses being supplied after the termination of the supply of preheating current and within a period corresponding to the duration of one cycle of said alternating current.

7. A resistance spot welding system comprising means for supplying alternating current to a welding load to preheat the material at the spot to be welded, and a plurality of condensers for supplying a plurality of successive overlapping impulses of stored energy to said welding load to effect the welding operation, the first of said impulses being supplied after the termination of the supply of preheating current and within a period corresponding to the duration of one cycle of said alternating current.

8. The method of resistance spot welding which comprises supplying alternating current to a welding load to preheat the material at the spot to be welded, and supplying a plurality of successive overlapping impulses of stored energy to said welding load to effect the welding operation, the first of said impulses being supplied after the termination of the supply of preheating current and within a period corresponding to the duration of one cycle of said alternating current, said successive impulses being supplied in a single direction and opposite to the direction of the last half-wave of preheating current.

9. A resistance spot welding system comprising means for supplying alternating current to a welding load to preheat the material at the spot to be welded, means for supplying a plurality of successive overlapping impulses of stored energy to said welding load to effect the welding operation, means to initiate the first of said impulses after the termination of the supply of preheating current and within a period corresponding to the duration of one cycle of said alternating current, and means whereby said successive welding impulses are supplied in a single direction and opposite to the direction of the last half-wave of preheating current.

10. A resistance spot welding system comprising means for supplying alternating current to a welding load to preheat the material at the spot to be welded, a plurality of condenser banks for supplying a plurality of successive overlapping impulses of stored energy to said welding load to effect the welding operation, means to initiate the first of said impulses after the termination of the supply of preheating current and within a period corresponding to the duration of one cycle of said alternating current, and means whereby said successive impulses are supplied in a single direction and opposite to the direction of the last half-wave of preheating current.

11. A resistance spot welding system comprising means for supplying alternating current to a welding load to preheat the material at the spot to be welded, an energy storage means, means effective within a few milliseconds after the termination of the last half-wave of preheating current to establish an initial wave front of welding current through said load from said storage means, a plurality of additional storage means for supplying additional impulses of welding current in the same direction as the initial wave front, and means to time the discharge of said additional storage means to maintain a substantially constant direct current through said welding load.

12. A resistance welding system including an alternating current source for supplying preheat to a welding load, a welding transformer connected to said source, a pair of discharge tubes in said connections alternately discharging to control the flow of current in opposite directions through said welding transformer, means for varying the timing of the discharge of said tubes within the range of one half wave of said alternating current source to vary the portion of any half-wave of said source transmitted to said transformer, a plurality of condenser banks for supplying a plurality of impulses of welding current through said transformer in a single direction, a discharge tube for each condenser bank for controlling the discharge of said condenser banks, means to time the discharge of said tubes to occur during successive half-wave periods of said alternating current source, and means to vary the timing of the discharge of each of said condenser banks within the range of said half-wave periods.

13. A resistance spot welding system comprising means for supplying alternating current to a welding load to preheat the material at the spot to be welded, and means for supplying a plurality of successive overlapping impulses of stored energy to the welding load after the termination of said alternating current and in immediate, proximate sequence thereto to effect the welding operation.

14. A resistance spot welding system comprising means for supplying alternating current to a welding load to preheat the material at the spot to be welded, and a plurality of condenser banks for supplying a plurality of successive overlapping impulses of stored energy to the welding load after the termination of said alternating current and in immediate, proximate sequence thereto to effect the welding operation.

15. A resistance spot welding system comprising means for supplying alternating current to a welding load to preheat the material at the spot to be welded, energy storage means for supplying direct current to the welding load after the termination of said alternating current and within a period corresponding to the duration of one cycle of said alternating current to effect the welding operation, and means to vary the effective value of said welding current.

16. A resistance spot welding system comprising means for supplying alternating current to a welding load to preheat the material at the spot to be welded, means for supplying a plurality of successive overlapping impulses of stored energy to the welding load after the termination of said alternating current and within a period corresponding to the duration of one cycle of said alternating current to effect the welding operation, and means for altering the duration of the periods between the initiation of said successive impulses.

17. A resistance spot welding system comprising means for supplying alternating current to a welding load to preheat the material at the spot to be welded, means for varying the effective value of said preheating current, a plurality of condenser banks for supplying a plurality of successive overlapping impulses of stored energy to the welding load after the termination of said alternating current and within a period corresponding to the duration of one cycle of said alternating current to effect the welding operation, and means for altering the duration of the periods between the initiation of said successive impulses.

JOHN W. DAWSON.